United States Patent
Curran

(10) Patent No.: US 8,458,751 B2
(45) Date of Patent: Jun. 4, 2013

(54) SYSTEMS AND METHODS FOR ACCESSING SELECTED PACKETIZED PROGRAMMING STREAMS

(75) Inventor: Martin Curran, Cheyenne, WY (US)

(73) Assignee: EchoStar Technologies L.L.C., Englewood, CO (US)

( * ) Notice: Subject to any disclaimer, the term of this patent is extended or adjusted under 35 U.S.C. 154(b) by 481 days.

(21) Appl. No.: 12/423,639

(22) Filed: Apr. 14, 2009

(65) Prior Publication Data

US 2010/0262999 A1    Oct. 14, 2010

(51) Int. Cl.
*H04N 7/20* (2006.01)

(52) U.S. Cl.
USPC .............................. 725/63; 725/105; 725/114

(58) Field of Classification Search
None
See application file for complete search history.

(56) References Cited

U.S. PATENT DOCUMENTS

| | | | |
|---|---|---|---|
| 6,305,019 B1* | 10/2001 | Dyer et al. | 725/91 |
| 7,089,577 B1* | 8/2006 | Rakib et al. | 725/87 |
| 2004/0068751 A1* | 4/2004 | Basawapatna et al. | 725/117 |

* cited by examiner

*Primary Examiner* — Brian T. Pendleton
*Assistant Examiner* — Nnenna Ekpo
(74) *Attorney, Agent, or Firm* — Lowe Graham Jones PLLC

(57) ABSTRACT

Programming stream communication systems and methods are operable to communicate programming streams to a media transmit facility. An exemplary embodiment receives at the media transmit facility a first packetized programming stream (PPS), the first PPS including a first programming stream (PS) generated by a first local programming provider (LPP); receives at the media transmit facility a second PPS, the second PPS including a second PS generated by a second LPP; multiplexes the first PS and the second PS into a transport channel; and communicates the transport channel from the media transmit facility.

17 Claims, 3 Drawing Sheets

SYSTEMS AND METHODS FOR ACCESSING SELECTED PACKETIZED PROGRAMMING STREAMS

BACKGROUND

Media service providers provide a variety of media to their clients. Typically, each client receives a stream of media content at their media device. The received media stream typically comprises many different "channels" of program content. For example, a satellite-based or cable-based media provider may provide many "channels" of television programming and/or music programming to the client's media device, such as a set top box (STB) or other suitable receiver. The client then selects one of the "channels" of program content for presentation. The client's media device then parses out the selected "channel" of program content, and then presents it to the client. For example, the client may select a particular television "channel" to view a movie. The selected movie is then parsed out for the received stream of media content and presented to the client on their television (TV) and surround sound audio system.

In order to transmit the media content stream, also referred to as a transport channel, with the many different "channels" of program content, the media service provider must initially receive each of the individual "channels" of program content. The various "channels" of program content are received at one or more centralized media transmit facilities, such as a satellite uplink center (when the media service provider distributes the program content via one or more satellites to the clients).

Then, the received individual "channels" of program content are multiplexed (aggregated) into a single transport channel. The transport channel, or in some instances a plurality of transport channels, are then communicated to the client's media device. For example, the satellite-based media provider would transmit the transport channel(s) to one or more satellites. The satellites would then transmit the received transport channels down to a receiver antenna that is connected to the client's STB or other media device. As another example, the cable-based media provider would transmit its transport channel to the client's STB or other media device over a cable system.

Presentation of a selected "channel" of program content to the client is done on a real time basis, or near real time basis. For example, if a movie is scheduled to be presented at a particular time on a particular day, the client who wants to watch the movie will turn on their media device at the scheduled time and day, and then select the program channel that is presenting the movie. The client has an expectation that the movie will be presented as scheduled. Thus, it is appreciated that the task of collecting the many different "channels" of program content, aggregating the "channels" of program content into a transport channel, and then transmitting the transport channel to the client on a real time basis, or near real time basis, is a very complex task.

To facilitate collecting the many different "channels" of program content at the media transmit facility, a plurality of local receive facilities (LRF) collect and aggregate programming content received from a plurality of local programming providers located in a common geographic region. For example, a first LRF may be located in the Atlanta metropolitan area and receive programming from the local television stations and any national-based television news providers based in the Atlanta region. A second LRF may be located in the Seattle metropolitan area and receive programming from the local television stations and any national-based television news providers based in the Seattle region.

The Atlanta LRF would have communication links established to each of the local Atlanta area programming providers. As each of the local programming providers transmit their respective local program stream to the Atlanta LRF, the Atlanta LRF would multiplex (aggregate) the received local program streams into a local transport channel. Then, the Atlanta LRF would transmit the local transport channel to the centralized media transmit facility(s). The process of receiving, multiplexing, and transmitting the local Atlanta program streams is occurring on a real time basis, or near real time basis.

Similarly, the Seattle LRF would have communication links established to each of the local Seattle area programming providers. As each of the local programming providers transmit their respective local program stream to the Seattle LRF, the Seattle LRF would multiplex the received local program streams into a local transport channel. Then, the Seattle LRF would transmit the local transport channel to the centralized media transmit facility(s). The process of receiving, multiplexing, and transmitting the local Seattle program streams is also occurring on a real time basis, or near real time basis.

Conventional LRFs aggregate the received local programming streams into a local transport channel that is typically communicated to the media transmit facility over a single, high capacity communication link which has sufficient capacity to transmit a large amount of information (corresponding to the multiplexed local program streams). The use of the high capacity communication link, which is often a dedicated link, is relatively efficient and cost effective for communicating large amounts of information. However the cost of using the high capacity communication link is relatively expensive, and there is a potential risk of loss of the entire transport channel in the event of a problem on the high capacity communication link.

In many instances, the legacy local transport channels are transmitted to a plurality of different centralized media transmit facilities. For example, a satellite-based media provider may have many different satellites each located over different regions of the earth. Here, it may not be possible to communicate with all satellites from a single geographic location. Thus, the satellite-based media provider would use several different centralized media transmit facilities to provide the transport channels that are transmitted to selected satellites that are within reception range of that particular media transmit facility.

In some situations, the transport channels are constructed so as to have specific programming to accommodate the interests of clients in a particular geographic region. A transport channel with specific, geographic based programming is referred to as a geographic-specific transport channel. That is, clients living in Atlanta are likely not interested in local programming pertaining to the Seattle region that is provided by the local programming providers in Seattle. For example, if a movie is being presented by an Atlanta station at 9:00 p.m. EST, and the same movie is being presented by a Seattle station at 9:00 pm (PST), it is appreciated that the client living in Atlanta will not likely want to watch the movie as it is being presented by the Seattle station since there is a three hour time difference between Atlanta and Seattle. As another example, if the Seattle station is presenting a local Seattle news program, it is likely that the client living in Atlanta will have little or no interest in viewing the Seattle local news program.

Accordingly, the centralized media transmit facility must construct a first local transport channel from selected local program streams for the preferences of its Atlanta clients. The same, or a different, centralized media transmit facility must also construct a second local transport channel for the preferences of its Seattle clients. In view of the many different metropolitan regions across the country, and even across the world, it is appreciated that a media service provider will have to collect thousands of different locally-generated programming streams, aggregate them at many different LRFs into respective local transport channels, transmit the many local transport channels to one or more centralized media transmit facilities, parse out selected local program streams of interest, and then re-construct the selected program streams into particular geographic-specific transport channels. To further complicate matters, it is appreciated that this entire process must occur on a real time basis, or near real time basis.

As another matter, reliability of service is critical to the media service provider because when a client tries to watch a program of interest, the client expects the program to be available. The client is likely to be irritated if the program is not available due to some sort of problem on the part of the media service provider. As noted above, the local transport channel is communicated to one or more centralized media transmit facilities over a dedicated, high capacity communication channel. In some instances, the media service provider may have a back up high capacity communication channel to provide redundancy in the event that there is a failure of the primary high capacity communication channel. Providing a back up high capacity communication channel is relatively expensive, but may be absolutely necessary if client satisfaction and/or client retention is an issue for the media service provider.

Accordingly, there is a need to more efficiently and reliably collect, aggregate, and communicate the plurality of local media streams to the clients of the media service provider.

SUMMARY

Systems and methods of communicating programming streams to a media transmit facility are disclosed. An exemplary embodiment has a first interface configured to generate a first packetized programming stream (PPS) with a first programming stream (PS) generated by a first local programming provider; a second interface configured to generate a second PPS with a second PS generated by a second local programming provider; a PPS receiver configured to receive the first PPS and the second PPS; and a programming stream multiplexor configured to generate a transport channel that includes the first PS and the second PS.

In accordance with further aspects, an exemplary embodiment receives at the media transmit facility a first PPS, the first PPS including a PS generated by a first local programming provider (LPP); receives at the media transmit facility a second PPS, the second PPS including a second PS generated by a second LPP; multiplexes the first PS and the second PS into a transport channel; and communicates the transport channel from the media transmit facility.

BRIEF DESCRIPTION OF THE DRAWINGS

Preferred and alternative embodiments are described in detail below with reference to the following drawings.

DETAILED DESCRIPTION

Figure 1:
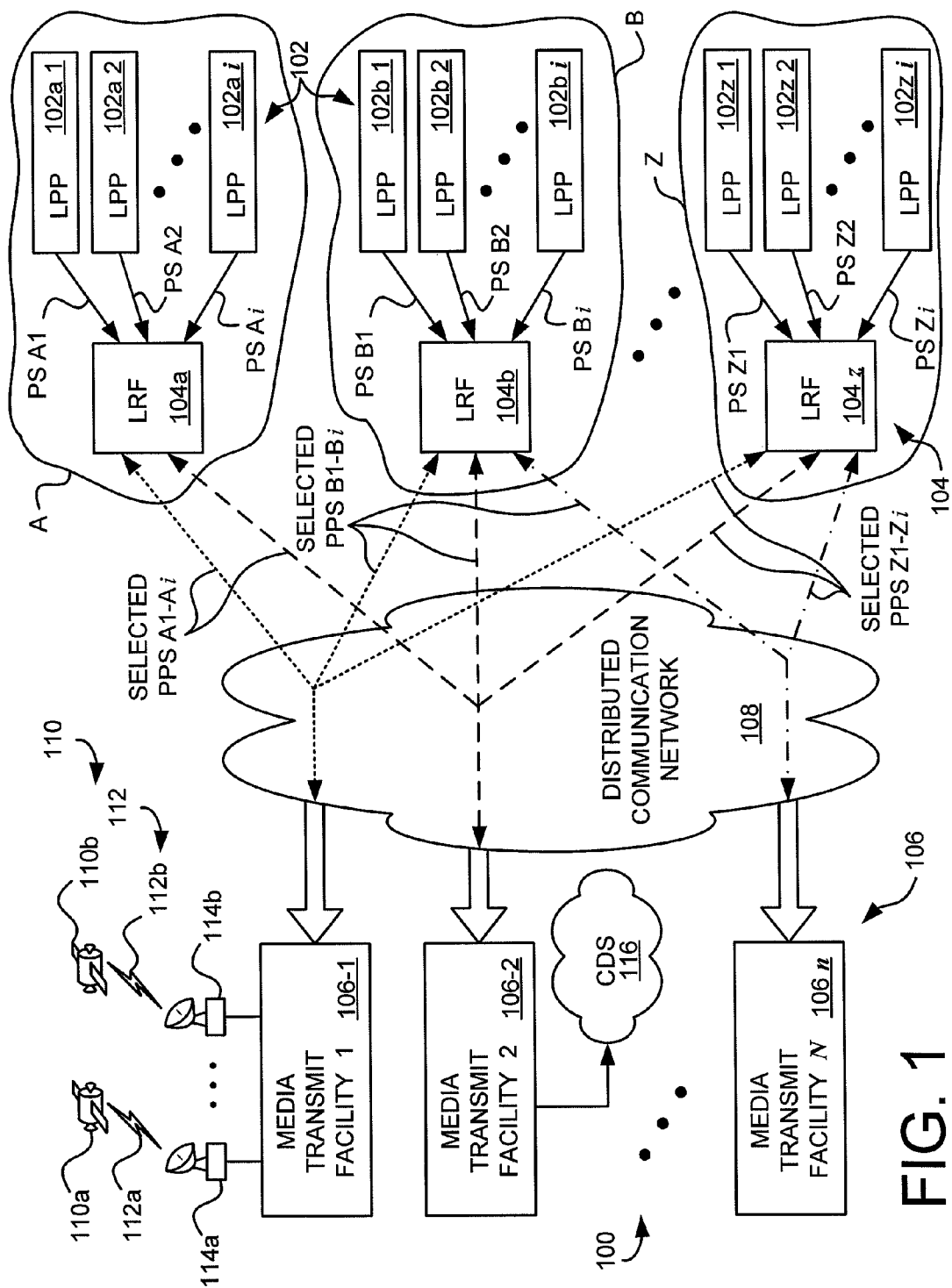
FIG. 1 is a block diagram of an embodiment of the programming stream access system.

FIG. 1 is a block diagram of an embodiment of a programming stream access system 100. An exemplary embodiment of the programming stream access system 100 provides selected access to programming streams generated by a plurality of local program providers (LPP) 102.

The LPPs 102 generate one or more programming streams (PS) that are ultimately provided to the clients of a media service provider. In an exemplary embodiment, geographic groupings of LPPs 102 communicate their respective one or more programming streams to a local receive facility (LRF) 104 located in the respective geographic region of the LPPs 102. The LRFs 104 then process the received programming streams into packet-based programming streams, and then make the packetized programming streams available to the media transmit facilities 106. Then, the media transmit facilities 106 selectively access individual programming streams via a distributed communication network 108.

Non-limiting examples of the distributed communication network 108 include the Internet and/or the World Wide Web (WWW). In alternative embodiments, the distributed communication network 108 may include standard telephony systems, frame relay based systems, internet or intranet systems, local access network (LAN) systems, Ethernet systems, cable systems, a radio frequency (RF) systems, cellular systems, or the like. Furthermore, the distributed communication network 108 may be a hybrid system comprised of one or more of the above-described systems.

Conventional LRFs aggregate the local programming streams into a high bandwidth local transport channel that is communicated over high capacity communication links to each of the conventional media transmit facilities. In contrast, embodiments of the programming stream access system 100 access selected individual programming streams. Accordingly, embodiments of the programming stream access system 100 do not require the prior art high bandwidth local transport channels. Further, since only selected programming streams of interest are accessed by the media transmit facility 106, overall transmission bandwidth is reduced and greater operational flexibility is achieved.

For example, assume that a first media transmit facility 106-1 is providing programming services to clients in a particular geographic region (denoted as region "A"). Accordingly, the first media transmit facility 106-1 would require all of the programming streams PS A1-Ai provided by the LPPs 102*a*1-102*ai* in the geographic region A. Also, assume that the first media transmit facility 106-1 is interested in selectively accessing the programming stream PS B2 provided by the LPP 102*b*2 in the second geographic region (denoted as region "B"), and the programming stream PS Z1 provided by the LPP 102*z*1 in the third geographic region (denoted as region "Z"). The programming streams PS B2 and PS Z1 may be national programs, such as a news program or the like, that is of interest to clients in the first geographic region A.

The first media transmit facility 106-1 would establish one or more communication links with the LRF 104*a* in the first geographic region A. LRF 104*a* processes the programming streams PS A1-Ai received from the LPPs 102*a*1-102*ai* into packetized programming streams (PPS). The first media transmit facility 106-1 would then access the packetized programming streams PPS A1-Ai available at the LRF 104*a*. In an embodiment where the first media transmit facility 106-1 communicates to the LRF 104a via the Internet, the accessing could be analogous to the means used by PC users who access the Internet for streaming video media.

In addition, in this simplified example, assume that the first media transmit facility 106-1 will be providing the programming streams PS B2 and PS Z1 to the clients in the geographic region A. Accordingly, the first media transmit facility 106-1 establishes a communication link with the LRF 104b in the geographic region B and accesses the selected packetized programming stream PPS B2. The first media transmit facility 106-1 also establishes a communication link with the LRF 104z in the geographic region Z and accesses the selected packetized programming streams PPS Z1. Thus, the first media transmit facility 106-1 selectively receives the programming streams of interest (PS B2, and PS Z1) in this simplified hypothetical example.

Continuing with the simplified example, assume that a second media transmit facility 106-2 is providing programming services to clients in the second geographic region B and a portion of the third geographic region Z. Accordingly, the second media transmit facility 106-2 accesses all of the packetized programming streams (PPS B1-Bi) provided by the LPPs 102b1-102bi in the geographic region B and all of the packetized programming streams (PPS Z1-Zi) provided by the LPPs 102z1-102zi in the geographic region Z. Also, the second media transmit facility 106-2 may be interested in accessing two of the programming stream (PS A1 and PS A2) provided by the LPP 102a1 and LPP 102a2 in the first geographic region A. Thus, the second media transmit facility 106-2 selectively accesses the packetized programming streams of interest (PPS A1, PPS A2, PPS B1-Bi, and PPS Z1-Zi) in this simplified hypothetical example.

Further, assume that the third media transmit facility 106-3 is providing programming services to clients in the remaining portion of the third geographic region Z. Accordingly, the third media transmit facility 106-3 accesses all of the packetized programming streams (PPS B1-Bi) provided by the LPPs 102z1-102zi in the geographic region Z. Also, the third media transmit facility 106-3 may be interested in accessing the programming stream (PS B1) available at the LPPs 102b1 in the second geographic region B. Thus, the third media transmit facility 106-3 selectively accesses the packetized programming streams of interest (PPS Z1-Zi and PPS B1) in this simplified hypothetical example.

Once the media transmit facilities 106 access the packetized programming streams of interest, the received packetized programming streams are further processed into signals that are suitable for transmitting from the media transmit facilities 106. The format of a transport channel is predefined such that construction of the transport channel must be controlled to specified data packet formats and data packet bit sizes. Since the packet size of the transport channel is predefined, when a plurality of programming streams are multiplexed together to form the transport channel, the multiplexing must be performed in a precise manner.

At a conventional media transmit facility, many different local transport channels are received from a large number of LRFs. The programming streams of each local transport channel must be unbundled, buffered in a memory, and then selectively retrieved and assembled into a transport channel using the specified packet size. That is, programming streams of interest must be retrieved from the buffered memory while other programming streams that are not included in the transport channel are ignored, discarded, or otherwise deleted. This process is relatively complex and requires significant amounts of processing power and memory capacity. The process is further complicated if the conventional media transmit facility is transmitting a plurality of transport channels with different programming streams selected from a plurality of different LRFs.

In contrast, embodiments of the programming stream access system 100 can more efficiently and effectively assemble a transport channel because only the packetized programming streams of interest are accessed. In the exemplary embodiment illustrated in FIG. 1, the packetized programming streams of interest are accessed directly from the LRFs 104. Thus, embodiments of the programming stream access system 100 avoid the step of unbundling the many received local transport channels that is required at the conventional media transmit facilities. Further, since only the packetized programming streams of interest are accessed by the media transmit facility 106, the memory storage requirements for program stream buffering is reduced. An exemplary embodiments employs suitable multiprotocol label switching (MPLS) data system to transport program streams over the internet from a LPP to the media transmit facility 106, interchangeably referred to as a head end. An exemplary MPLS data system is the Internet.

Also, the conventional media transmit facility receives the programming streams from a plurality of LRFs over one or more high capacity communication links. In the event of a failure of a high capacity communication link all programming streams multiplexed into the local transport channel are lost. In contrast embodiments of the programming stream access system 100 use many different links to directly access selected packetized programming streams. These links are relatively reliable. If the link is disrupted, the link may be easily and quickly re-established. Further, if one link is disrupted, one programming stream is lost.

In FIG. 1, the first media transmit facility 106-1 is illustrated as a satellite uplink center that transmits satellite-based wireless signals to a plurality of satellites 110. It is appreciated that the first media transmit facility 106-1 may be transmitting to many different satellites that are within its reception range. A plurality of different transport channel signals 112 tailored for the needs of particular geographic regions. For example, assume that the satellite 110a is located over the geographic region A (wherein the programming streams of interest are PS A1-Ai, PS B2, and PS Z1). Further, assume that the satellite 110b is located over the geographic region B (wherein the programming streams of interest are PS A1, PS A2, PS B1-Bi, and PS Z1-Zi). Thus, the first media transmit facility 106-1 transmits a first transport channel signal 112a from an antenna 114a to the satellite 110a. A second transport channel signal 112b is transmitted from an antenna 114b to the satellite 110b.

The satellite uplink center constructs the first transport channel signal 112a from the accessed packetized programming streams PPS A1-Ai, PPS B2, and PPS Z1. The second transport channel signal 112b is constructed from the packetized programming streams PPS A1, PPS A2, PPS B1-Bi, and PPS Z1-Zi. Thus, the first satellite 110a receives the first transport channel signal 112a and then broadcasts the programming streams of interest PS A1-Ai, PS B2, and PS Z1 to the clients in geographic region A. The second satellite 110b receives the second transport channel signal 112b and then broadcasts the programming streams of interest PS A1, PS A2, PS B1-Bi, and PS Z1-Zi to the clients in geographic region B.

In FIG. 1, the second media transmit facility 106-2 is illustrated as a cable system distribution center that transmits wire-based signals into a cable distribution system (CDS) 116. Accordingly, clients connected to the CDS 116 receive programming via their home cable network. It is appreciated that the second media transmit facility 106-2 may be transmitting to many different cable system sub-distribution facilities located in specific geographic locations so that a plurality of different transport channel signals 112 are tailored for the needs of particular geographic regions.

In some embodiments, the programming streams received from the LPPs 102 are processed at the LRFs 104, and/or are processed at the LPPs 102, so that the accessed packetized programming streams are formatted and/or sized in a manner that facilities the construction of the transport channel signals 112 at the media transmit facilities 106. For example, there are many different forms of transport video streaming, such as, but not limited to, the MPEG-2 format which is used to compress a streaming plurality of video images. Further, the packetized programming streams may use various protocols, such as a user datagram protocol (UDP), a Real-time Streaming Protocol (RTSP), a Real-time Transport Protocol (RTP), or a Real-time Transport Control Protocol (RTCP). In such embodiments, the LRF 104 processes the received local programming streams into a specified format and/or protocol that is used by the media transmit facility 106.

When a plurality of different media transmit facilities 106 are accessing selected packetized programming streams available at the LRF 104, the LRF 104 may provide access to the packetized programming stream of interest in multiple formats and/or protocols that are preferred by the plurality of different media transmit facilities 106. Additionally, or alternatively, the programming streams available at the LRF 104 may be accessed over different types of distributed communication networks 108. Accordingly, the LRF 104 processes the received local programming streams into a particular communication format and/or protocol that is used by different types of the distributed communication networks 108.

Additionally, or alternatively, the packetized programming streams can be constructed by the LRFs 104 to have a packet size (bit length) that is same, or that is compatible with, the packet size of the transport channel signal 112. Thus, the amount of processing required at the media transmit facilities 106 may be reduced by transferring the processing functions downstream to the LRFs 104 and/or the LPPs 102.

Figure 2:
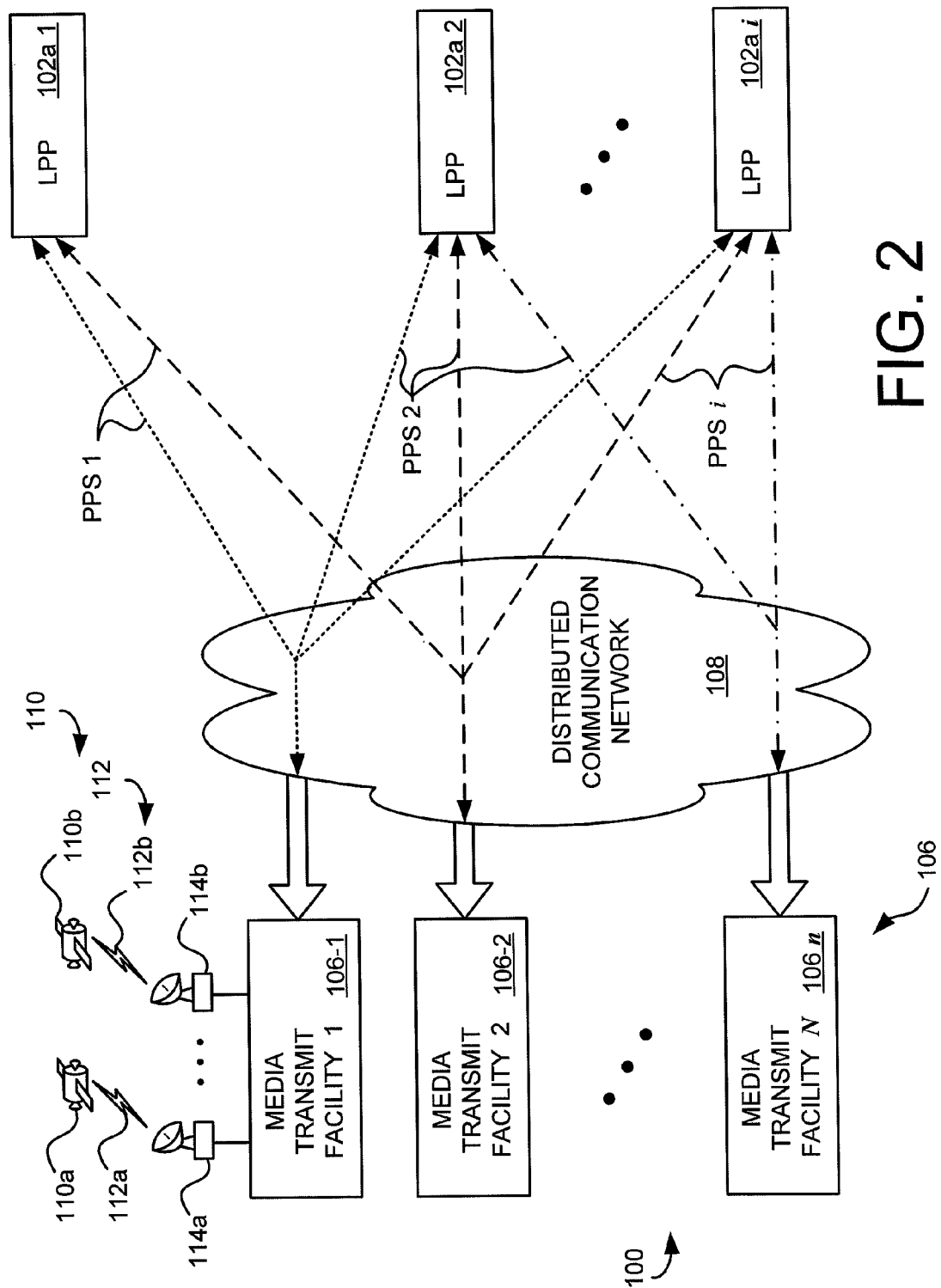
FIG. 2 is a block diagram of an alternative embodiment of the programming stream access system.

FIG. 2 is a block diagram of an alternative embodiment of the programming stream access system 100. The exemplary embodiment of the programming stream access system 100 directly accesses selected packetized programming streams at the LPPs 102. Thus, the intermediary LRFs 104 (FIG. 1) are bypassed.

Figure 3:
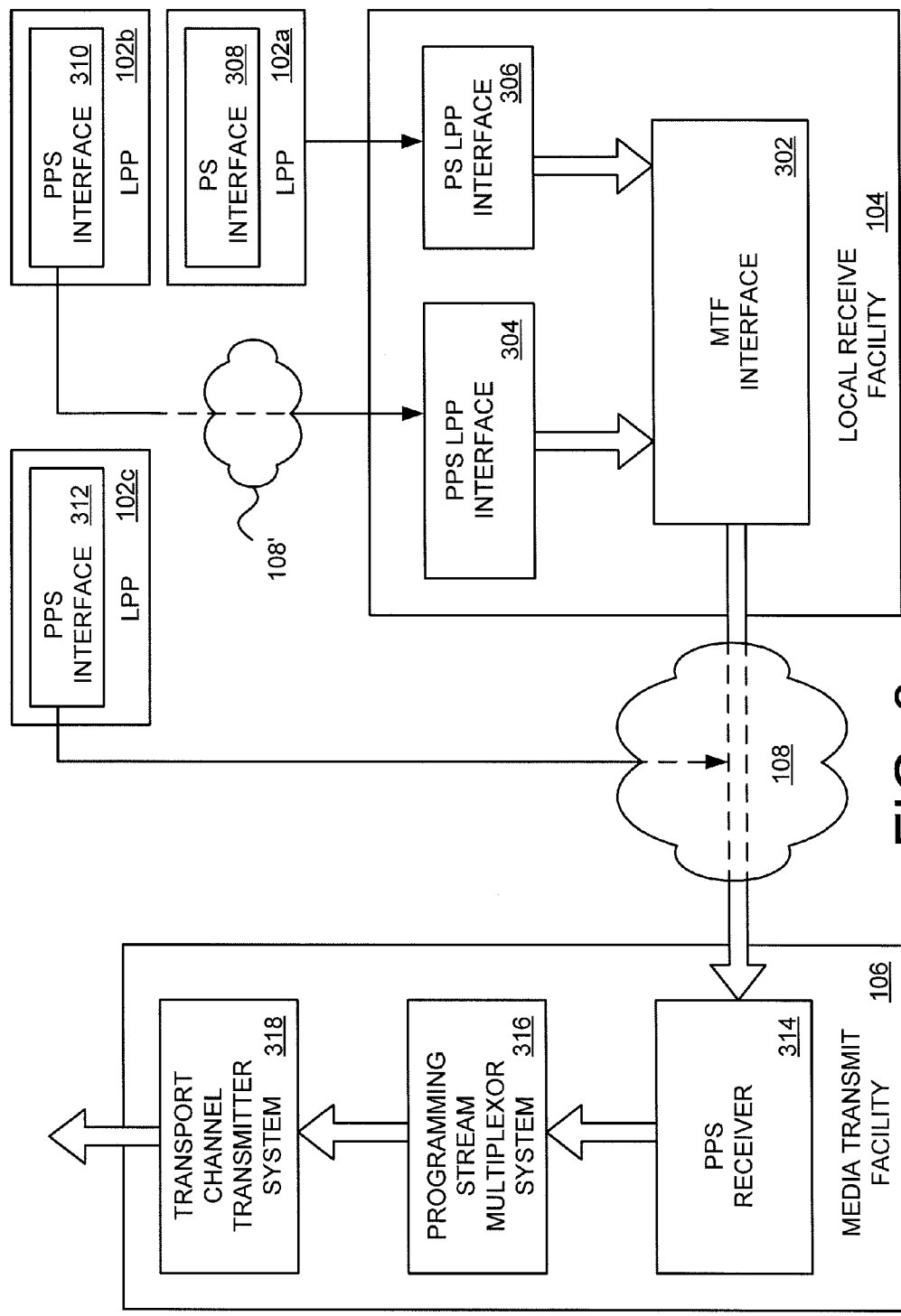
FIG. 3 is a block diagram illustrating selected components at an exemplary media transmit facility, an exemplary LRF, and three exemplary LPPs.

FIG. 3 is a block diagram illustrating selected components at an exemplary media transmit facility 106, an exemplary LRF 104, and three exemplary LPPs 102*a*, 102*b*, 102*c*. The LRF 104 comprises a media transmit facility (MTF) interface 302, an optional PPS (packetized programming stream) LPP (local programming provider) interface 304, and an optional PS (programming stream) LPP interface 306.

The LPP 102*a* includes a programming stream (PS) interface 308 that is communicatively coupled to (linked to) the PS LPP interface 306. The PS LPP interface 306 receives the programming stream generated by the LPP 102*a*, via the PS interface 308. The programming stream from the LPP 102*a* may in be any suitable legacy format. The MTF interface 302 packetizes the received programming stream such that the packetized programming stream is available to the media transmit facility 106 via the distributed communication network 108.

The LPP 102*b* includes a packetized programming stream (PPS) interface 310 that is communicatively coupled to (linked to) the PPS LPP interface 304. Here, the PPS interface 310 packetizes the received programming stream such that a packetized programming stream is available to the PPS LPP interface 304 residing at the LRF 104. The PS LPP interface 306 receives the programming stream generated by the LPP 102*b*, via the PPS interface 310. The packetized programming stream from the LPP 102*b* may in be any suitable format. The packetized programming stream from the LPP 102*b* is available to the LRS 104 via the distributed communication network 108' (which may be the same network as the distributed communication network 108, or which may be a different communication network).

The MTF interface 302 may optionally further process the received packetized programming stream based upon the needs of the receiving media transmit facility 106. The packetized programming stream generated by the LPP 102*b* is then available to the media transmit facility 106.

The LPP 102*c* includes a packetized programming stream (PPS) interface 312. The PPS interface 312 packetizes the programming stream generated by the LPP 102*c*. The packetized programming stream from the LPP 102*c* is directly available to the media transmit facility 106 via the distributed communication network 108.

The PPS receiver 314 is communicatively coupled to the distributed communication network 108 and receives packetized programming streams. The packetized programming streams are processed may be optionally further processed, and then communicated to a programming stream multiplexor system 316. The programming stream multiplexor system 316 multiplexes the received plurality of selected programming streams into a transport channel. Then, the constructed transport channel is communicated out from the media transmit facilities 106 by a transport channel transmitter system 318. The PSS receiver 314, the programming stream multiplexor system 316, and the transport channel transmitter system 318 include various components and subsystems not described herein.

In the various embodiments of the programming stream access system 100, packetized programming streams are communicated to the media transmit facility 106, depending upon the particular embodiments, using the MTF interface 302, the PPS LPP interface 304, the PPS interface 310, the PPS interface 312, and/or the PPS receiver 314. Nonlimiting example of these interfaces include servers, modems or the like. These devices may, in some embodiments, be configured in accordance with the seven layer Open Systems Interconnection (OSI) model, the internet protocol (IP) model, transmission control protocol (TCP) model, the user datagram protocol (UDP) model, the datagram congestion control protocol (DCCP) model, stream control transmission protocol (SCTP) model, or other suitable packetized data model.

Links between the transmitting interfaces 302, 310, 312 and the receiving PPS receiver 314 and/or the PPS LPP interface 304 can be established using any suitable process. Further, the encapsulated data carrying a packetized programming stream may be encrypted using any suitable encryption and/or security process.

It should be emphasized that the above-described embodiments of the programming stream access system 100 are merely possible examples of implementations of the invention. Many variations and modifications may be made to the above-described embodiments. All such modifications and variations are intended to be included herein within the scope of this disclosure and protected by the following claims.

The embodiments of the invention in which an exclusive property or privilege is claimed are as defined as follows:

1. A method for communicating programming streams to a media transmit facility, the method comprising:

receiving a first programming stream (PS) and a second PS at a first local receive facility (LRF), the first PS communicated from a first local program provider (LPP) to the first LRF, the second PS communicated from a second LPP to the first LRF, wherein the first LRF, the first LPP and the second LPP are in a first geographic region;

receiving a third PS and a fourth PS at a second LRF, the third PS communicated from a third LPP to the second LRF, the fourth PS communicated from a fourth LPP to the second LRF, wherein the second LRF, the third LPP and the fourth LPP are in a second geographic region that is different from the first geographic region;

packetizing, at the first LPP, the first PS into a first packetized programming stream (PPS) and the second PS into a second PPS;

packetizing, at the second LPP, the third PS into a third PPS and the fourth PS into a fourth PPS;

separately receiving at the media transmit facility, via a multiprotocol label switching (MPLS) data system, the first PPS and the second PPS from the first LRF;

separately receiving at the media transmit facility, via the MPLS data system, the third PPS and the fourth PPS from the second LRF;

multiplexing the first PS, the second PS, the third PS, and the fourth PS into a transport channel; and communicating the transport channel from the media transmit facility.

2. The method of claim 1, wherein communicating the transport channel from the media transmit facility comprises: transmitting the transport channel to a satellite.

3. The method of claim 1, wherein communicating the transport channel from the media transmit facility comprises: transmitting the transport channel over a cable distribution system.

4. The method of claim 1, further comprising: generating the first PPS at the first LPP.

5. The method of claim 1, further comprising: generating the first PPS using a predefined packet-based communication format that is used by the media transmit facility.

6. The method of claim 1, further comprising: generating the first PPS using a predefined data packet size that is used by the media transmit facility.

7. The method of claim 1, further comprising: generating the first PPS using a predefined data packet size that is used by the transport channel.

8. The method of claim 1, further comprising: multiplexing the first PS and the third PS into a second transport channel; and
communicating the second transport channel from the media transmit facility.

9. The method of claim 1, wherein the first PPS, the second PPS, the third PPS, and the fourth PPS are received over the Internet.

10. The method of claim 1, wherein after receiving the first PS, the second PS, the third PS, and the fourth PS at the media transmit facility, the method further comprising:
extracting the first PS from the first PPS;
extracting the second PS from the second PPS;
extracting the third PS from the third PPS; and
extracting the fourth PS from the fourth PPS,
wherein the extracted first PS, the extracted second PS, the extracted third PS, and the extracted fourth PS are multiplexed into the transport channel.

11. A programming stream communication system, comprising:
a first local receive facility (LRF) located in a first geographic region, comprising:
a first program stream local program provider (PS LPP) interface communicatively coupled to a first local program provider, wherein the first PS LPP receives a first program stream from the first local program provider located in the first geographic region, and wherein the received first PS is packetized into a first packetized programming stream (PPS);
a second PS LPP interface communicatively coupled to a second local program provider, wherein the second PS LPP receives a second program stream from the second local program provider located in the first geographic region, and wherein the received second PS is packetized into a second PPS; and
a first media transmit facility (MTF) interface communicatively coupled to a media transmit facility via a multiprotocol label switching (MPLS) data system, wherein the first MTF interface communicates the first PPS and the second PPS to the media transmit facility over the MPLS system;
a second LRF located in a second geographic region, wherein the second geographic region is different from the first geographic region, comprising:
a third PS LPP interface communicatively coupled to a third local program provider, wherein the third PS LPP receives a third program stream from the third local program provider located in the second geographic region, and wherein the received third PS is packetized into a third PPS;
a fourth PS LPP interface communicatively coupled to a fourth local program provider, wherein the fourth PS LPP receives a fourth program stream from the fourth local program provider located in the second geographic region, and wherein the received fourth PS is packetized into a fourth PPS; and
a second media transmit facility (MTF) interface communicatively coupled to the media transmit facility via the MPLS data system, wherein the second MTF interface communicates the third PPS and the fourth PPS to the media transmit facility over the MPLS system;
the media transmit facility, comprising:
a packetized programming stream (PPS) receiver, comprising:
a first interface configured to receive the first PPS with the first PS generated by the first local programming provider;
a second interface configured to receive the second PPS with the second PS generated by the second local programming provider;
a third interface configured to receive the third PPS with the third PS generated by the third local programming provider; and
a fourth interface configured to receive the fourth PPS with the fourth PS generated by the fourth local programming provider,
wherein the first PS is extracted from the first PPS, the second PS is extracted from the second PPS, the third PS is extracted from the third PPS, and the fourth PS is extracted from the fourth PPS; and
a programming stream multiplexor configured to generate a transport channel that includes at least the extracted first PS, the extracted second PS, the extracted third PS, and the extracted fourth PS.

12. The programming stream communication system of claim 11, wherein the first interface resides at at least one of a local receive facility and a local program provider.

13. The programming stream communication system of claim 11, wherein the first interface and the second interface respectively receive the first PPS and the second PPS via the Internet.

14. A programming stream communication method, comprising:
- receiving, at a media transmit facility, a first packetized programming stream (PPS) communicated from a first local receive facility located in a first geographic region over a multiprotocol label switching (MPLS) data system, the first PPS including a first programming stream (PS) generated by a first local programming provider (LPP) located in the first geographic region, and wherein the first PS is packetized into the first PPS at the first local receive facility; and
- receiving, at the media transmit facility, a second PPS communicated from a second local receive facility located in a second geographic region over the MPLS data system, the second PPS including a second PS generated by a second LPP located in the second geographic region, wherein the first PS is packetized into the first PPS at the first local receive facility, and wherein the second geographic region is different from the first geographic region.

15. The method of claim 14, wherein at least a portion of the MPLS data system is the Internet.

16. The programming stream communication system of claim 11, wherein the media transmit facility further comprises:
- a transport channel transmitter system that broadcasts the transport channel which is received at a plurality of media devices, wherein the media devices are located in one of the first geographic region and the second geographic region.

17. The method of claim 14, further comprising:
- extracting, at the media transmit facility, the first PS from the first PPS;
- extracting, at the media transmit facility, the second PS from the second PPS;
- multiplexing the extracted first PS and the extracted second PS into a transport channel; and
- broadcasting, from the media transmit facility, the transport to a plurality of media devices, wherein the media devices are located in one of the first geographic region and the second geographic region.

* * * * *